United States Patent
Ramlow

(10) Patent No.: US 6,936,658 B2
(45) Date of Patent: Aug. 30, 2005

(54) THERMOPLASTIC COMPOSITION COMPRISING AT LEAST ONE TRANSPARENT OR TRANSLUCENT THERMOPLASTIC MATERIAL AND A PIGMENT

(75) Inventor: Anne Ramlow, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/750,894

(22) Filed: Dec. 28, 2000

(65) Prior Publication Data

US 2004/0266942 A1 Dec. 30, 2004

(51) Int. Cl.[7] .......................... C08L 33/00; C08L 67/00; C08L 69/00; C08K 5/04
(52) U.S. Cl. ...................... 524/604; 106/493; 106/494; 106/499; 252/299.01; 252/299.7
(58) Field of Search .................... 106/493, 494, 106/499; 252/299.01, 299.7; 524/604

(56) References Cited

U.S. PATENT DOCUMENTS 5,851,604 A * 12/1998 Muller-Rees et al. ...... 428/1.31
6,207,344 B1 * 3/2001 Ramlow et al. ......... 430/270.1

* cited by examiner

Primary Examiner—Kelechi C. Egwim

(57) ABSTRACT

The invention deals with thermoplastic compositions comprising at least one transparent or translucent thermoplastic material and a pigment wherein the thermoplastic composition comprises at least one cholesteric liquid crystal polymeric plate shaped pigment in a quantity of 0.55 or less parts by weight per 100 parts by weight of the transparent or translucent thermoplastic material.

14 Claims, No Drawings

THERMOPLASTIC COMPOSITION COMPRISING AT LEAST ONE TRANSPARENT OR TRANSLUCENT THERMOPLASTIC MATERIAL AND A PIGMENT

BACKGROUND OF THE INVENTION

The invention relates to thermoplastic compositions comprising at least one transparent or translucent thermoplastic material and a pigment.

There exists a need for thermoplastic compositions with esthetical effects. Such compositions can be obtained by incorporating in the compositions dyes or pigments. The interest in pigments which give special effects such as angular metamerism has lately grown considerably. To get this angular metamerism it is usually required to add suitable pigments in such amounts that so-called flow lines become visible. Flow-lines are from an esthetical point of view undesirable.

It has now been found that a special class of pigments giving angular metamerism give even in low concentrations interesting effects. At such low concentration flow lines are hardly visible or at least do not disturb the esthetical effect of objects molded out of the thermoplastic composition.

SUMMARY OF THE INVENTION

The invention deals with thermoplastic compositions which comprise at least one transparent or translucent thermoplastic material and a pigment which shows angular metamerism.

Molded articles made out of the thermoplastic compositions of the invention do not have or hardly show flow lines.

The compositions of the invention composition comprise at least one cholesteric liquid crystal polymeric plate shaped pigment in a quantity of 0.55 or less, preferably 0.25 or less, even more preferably 0.15 or less parts by weight per 100 parts by weight of the transparent or translucent thermoplastic material.

The thermoplastic material is preferably a polymer. Suitable polymers are aromatic polycarbonates, polyestercarbonates, polyesters or a poly acrylate based polymers.

DETAILED DESCRIPTION OF THE INVENTION

The present invention deals with thermoplastic compositions which comprise special pigments to give angular metamerism.

The pigments used in the composition of the invention are plate shaped and can be used in such low concentration that the molded articles hardly show visible flow lines.

The pigments used in the compositions of the invention can be described as cholesteric liquid crystal polymeric plate shaped pigments.

The compositions of the present invention comprise at least one transparent or translucent thermoplastic material. Transparent or translucent means in the sense of this patent application that plaques molded out of the thermoplastic materials used in the compositions of the invention by standard injection molding processes have in a thickness of 2.5 millimeter a transmission of visible light of at least 75%.

Angular metamerism is a well known optical effect. It means that objects molded out of the composition of the invention have a color which differs depending upon the angle under which the molded object is observed. This effect is known and has been obtained by adding plate shaped pigments to thermoplastic materials. To get this effect it is common knowledge to incorporate plate shaped pigments in thermoplastic compositions. To get the desired effect the pigments are usually added in quantities of up to about 1% by weight. At the required quantities to get angular metamerism the molded articles with commonly used plate shaped pigments show flow lines. Flow lines can be described as an optical surface effect making the appearance of the surface non-uniform showing how the thermoplastic material has flown in the mold during injection molding.

It has now been found that a specific class of plate shaped pigments as defined in the claims can be used at relatively low concentrations for obtaining an interesting angular metamerism without having the unfavorable flow lines.

The compositions of the invention comprise at least one cholesteric liquid crystal polymeric plate shaped pigment. Such pigments are commercially available.

Plate shaped is intended to indicate that the pigments have at least one substantially flat surface that will orient itself in an injection molding process parallel to the surface of molded articles. The pigment particles may be plate shaped i.e. they may be flat shaped particles with one dimension (the thickness) which is relatively small with respect to their other dimensions. It would also be possible to use rectangular or cube like shaped particles. The selected pigments are liquid crystal polymeric in nature. Liquid crystal polymeric means that the pigments have the same characteristics as liquid crystal polymers. This means for example that the polymer above its melting point enters into a state of matter with properties of both a solid crystal and melt. Such polymer molecules usually have an anisotropic form such as a rod or a disk shape. The selected pigments for the compositions of the invention should further be of a cholesteric structure: this is sometimes described as a twisted nematic helical structure. The cholesteric structure is preferably fixated by chemical crosslinking.

Processes for the preparation of cholesteric liquid crystal polymeric plate shaped pigments can be found for example in U.S. Pat. Nos. 5,851,604 and 5,976,239. Pigments suitable for the thermoplastic compositions of the invention can be obtained under the trademark HELICONE® HC from Wacker Chemie GmbH.

The polymeric composition of the invention comprises at least one transparent or translucent thermoplastic material. Suitable thermoplastic materials are polymers, such as for example aromatic polycarbonates, polyestercarbonates, polyesters and polyacrylates such as poly methyl methacrylates. Blends comprising one or more of said polymers or blends comprising besides the transparent or translucent thermoplastic material other polymers are also suitable.

Suitable aromatic polycarbonates are the polycarbonates derived from bisphenol A and similar diphenolic monomers. The polycarbonates can be made by different processes such as interfacial polymerisation and the so-called melt transesterification. The polycarbonates can be branched or linear. They may comprise besides the bisphenol residues of other monomers. It also possible to use polycarbonates which comprise besides the carrbonate linkage also ester linkages (so-called polyestercarbonates).

Suitable polyesters are aliphatic esters, which contain the residue of one or more cyclo-alkyl dicarboxylic acids and/or of one or more more cyclo-alkyl diols. A preferred example of this type of esters is poly (cyclohexane-1,4-dimethylene cyclohexane-1,4-dicarboxylate). This is the ester which can be obtained by condensation of 1,4-cyclohexane dimethanol and cyclohexane dicarboxylate.

Suitable poly acrylates are for example poly methyl methacrylates and similar polymers.

The compositions of the invention can comprise additional components such as dyes and other pigments, stabilizers, flame retardants. Since some of the cholesteric pigments as used in the compositions of the invention are not fully stable against UV light it can be advisable to incorporate an UV absorber in the composition of the invention.

EXAMPLES

The compositions as described in the Table here below have been prepared in quantities of 3–15 kilograms on a laboratory twin screw extruder. All ingredients were dry blended before introducing them in the extruder. The extrudate was chopped into pellets and the obtained pellets were injection molded into plaques of a thickness of about 2.5 millimeter in molds with a pin to obtain a flow pattern that may result in visible flow lines.

In the preparation of the compositions the following materials have been used:

PC-1: an aromatic polycarbonate derived from bisphenol A with an intrinsic viscosity of 53 ml/g.

interference plate shaped flake structure, which is opaque and highly specular. It contains a reflective metal core sandwiched by 2 glass-like layers, which are in turn coated with a semi-transparent absorber metal. This material is not a cholesteric liquid crystal.

Examples A–C are comparative examples, examples 1–11 are examples of the invention. The compositions of comparative examples A–B comprised another type of plate shaped pigment. At concentrations, which are high enough to give angular metamerism (comparative example B) this pigment also causes the appearance of flow lines. Comparative example C comprises cholesteric liquid crystal polymeric plate shaped pigments, but in a quantity of about 1 part per 100 parts of the thermoplastic material which is clearly above 0.55 parts by weight per 100 parts by weight of transparent thermoplastic. At this high concentration the sample shows angular metamerism but also flow lines.

All plaques of the examples of the invention (1–11) showed interesting optical properties such as angular metamerism and did not have flow lines or only very weakly visible flow lines.

TABLE

Compositions

| | Example No. | | | | | | | | | | | | | |
|---|---|---|---|---|---|---|---|---|---|---|---|---|---|---|
| | A | B | C | 1 | 2 | 3 | 4 | 5 | 6 | 7 | 8 | 9 | 10 | 11 |
| Components: | | | | | | | | | | | | | | |
| PC-1 | | | 97.75 | 98.65 | 98.70 | 98.725 | 98.74 | 98.745 | | | | | | |
| PC-2 | | | 0.5 | 0.5 | 0.5 | 0.5 | 0.5 | 0.5 | | | | | | |
| PC-3 | | | | | | | | | 99 | 99.4 | 99 | 99.4 | 99 | 99.4 |
| PC-4 | 99.57 | 99.57 | | | | | | | | | | | | |
| PETS | 0.27 | 0.27 | 0.4 | 0.4 | 0.4 | 0.4 | 0.4 | 0.4 | 0.4 | 0.4 | 0.4 | 0.4 | 0.4 | 0.4 |
| KSS | | | 0.25 | 0.25 | 0.25 | 0.25 | 0.25 | 0.25 | | | | | | |
| TP | 0.06 | 0.06 | 0.1 | 0.1 | 0.1 | 0.1 | 0.1 | 0.1 | 0.1 | 0.1 | 0.1 | 0.1 | 0.1 | 0.1 |
| Pigment: | | | | | | | | | | | | | | |
| Scarabeus | | | 1.0 | 0.1 | 0.05 | 0.025 | 0.01 | 0.005 | | | | | | |
| Sapphire | | | | | | | | | 0.5 | 0.1 | | | | |
| Maple | | | | | | | | | | | 0.5 | 0.1 | | |
| Jade | | | | | | | | | | | | | 0.5 | 0.1 |
| Pigment-1 | 0.01 | 0.1 | | | | | | | | | | | | |
| Effect: | | | | | | | | | | | | | | |
| Flow lines | No | Yes | Yes | No | No | No | No | No | Weak | No | Weak | No | Weak | No |
| Angular Metamerism | No | Yes | Yes | Yes | Yes | Yes | Yes | Yes | Yes | Yes | Yes | Yes | Yes | Yes |

PC-2: an aromatic polycarbonate derived from bisphenol A with an intrinsic viscosity of 58.5 ml/g.

PC-3: an aromatic polycarbonate derived from bisphenol A with an intrinsic viscosity of 58.5 ml/g.

PC-4: an aromatic polycarbonate derived from bisphenol A with an intrinsic viscosity of 49 ml/g.

PETS: pentaerythritol tetrastearate.

KSS: potassium diphenylsulphon-3-sulphonate.

TP: Tri (di-t.butylphenyl) phosphite.

Scarabeus, Sapphire, Maple and Jade: are all cholesteric liquid crystal polymeric plate shaped pigments obtained from Wacker Chemie GmbH. They have different colors.

Pigment 1: is ChromaFlair Silver/Green 060 from Flex Products Inc. This pigment is made up of a multi-layer

What is claimed is:

1. Thermoplastic composition comprising at least one transparent or translucent thermoplastic material and at least one pigment wherein the thermoplastic composition comprises at least one cholesteric liquid crystal polymeric plate shaped pigment in a quantity of less than 0.50 parts by weight per 100 parts by weight of the transparent or translucent thermoplastic material.

2. Thermoplastic composition of claim 1, which comprises 0.25 parts or less parts by weight of the cholesteric liquid crystal polymeric plate shaped pigment.

3. Thermoplastic composition of claim 1, which comprises as transparent or translucent thermoplastic material an aromatic polycarbonate, a polyester or a polyacrylate.

4. Thermoplastic composition of claim 1, which further comprises one or more dyes or pigments.

5. Thermoplastic composition of claim 1, which further comprises an UV absorber.

6. Thermoplastic composition comprising at least one transparent or translucent thermoplastic material and at least one pigment wherein the thermoplastic composition comprises at least one cholesteric liquid crystal polymeric plate shaped pigment in a quantity of 0.25 or less parts by weight per 100 parts by weight of the transparent or translucent thermoplastic material, wherein the pigment gives the composition an angular metamerism effect.

7. Thermoplastic composition of claim 6, which comprises as transparent or translucent thermoplastic material an aromatic polycarbonate, a polyester or a polyacrylate or blends thereof.

8. Thermoplastic composition of claim 6, which further comprises one or more dyes or pigments.

9. Thermoplastic composition of claim 6, which further comprises an UV absorber.

10. An article formed from the composition of claim 6.

11. A process for making a thermoplastic article having an angular metamerism effect, said process comprising:

forming an article by injection molding a transparent or translucent thermoplastic material, wherein the thermoplastic material comprises at least one cholesteric liquid crystal polymeric plate shaped pigment in a quantity of less than 0.50 parts by weight per 100 parts by weight of the transparent or translucent thermoplastic material, and wherein the article does not exhibit visible flow lines.

12. The process of claim 11, wherein the thermoplastic material comprises an aromatic polycarbonate, a polyester or a polyacrylate or blends thereof.

13. The process of claim 11, wherein the thermoplastic material further comprises an UV absorber.

14. An article formed by the process of claim 11.

* * * * *